Patented Aug. 1, 1950

2,517,223

UNITED STATES PATENT OFFICE

2,517,223

PREPARATION OF INTERNALLY OXIDIZED CATALYSTS

Russell M. Mantell, Newark, N. J., assignor to Allied Chemical & Dye Corporation, New York, N. Y., a corporation of New York No Drawing. Application August 23, 1948, Serial No. 45,790

8 Claims. (Cl. 75—22)

This invention relates to preparation of catalysts and more particularly refers to metal catalysts which have a highly porous, structurally firm catalytic body.

Metal oxide catalysts are commonly prepared by forming a mixture of the oxide, or a salt of the metal readily convertible to the oxide, with an inert porous material such as kieselguhr or powdered pumice and compressing the mixture into bodies of predetermined form, e. g. pellets, tablets, rods or the like. To prevent the compressed body from sticking to the die or punch of the machine, it is often necessary to incorporate in the mixture a lubricating agent such as stearic acid or graphite; further, in preparing such catalysts it is frequently necessary to include in the mixture to be compressed a material such as alumina or clay which will act as a binding agent to increase the structural strength of the final product.

In the preparation of metal oxide catalysts it has been suggested to compress the metal of the oxide into the desired shape and then oxidize the compressed metal body to the oxide by treatment with an oxygen-containing gas at elevated temperatures. This procedure, however, has not proved satisfactory because it is extremely difficult to oxidize a compressed metal body due to the tendency of the metal when heated to sinter into dense masses which are impervious to oxidation except on their outer surfaces; such a product, obviously, has little utility as a catalyst because the interior of the compressed body is not accessible to the reacting gases.

It is an object of this invention to provide an improved process for the formation of catalytic bodies of predetermined form, which process permits elimination of or a great reduction in the amounts of lubricants and binders conventionally employed in preparing such catalysts, and which gives a highly porous, structurally firm catalytic body.

I have found the above object may be accomplished by mixing the metal of the catalyst to be produced with a solid substance which upon application of heat at a temperature below the sintering point of the catalyst metal will decompose liberating a fluid oxidizing substance, compressing such mixture into bodies of predetermined form and then heating said bodies preferably in the presence of air or other oxygen-containing gas to effect decomposition of the solid substance and oxidation of the metal, whereby structurally firm, highly porous metal oxide bodies are produced. I have found the mixture of the metal and solid substance which I term oxidant may be compressed into bodies of predetermined form, such as pellets or tablets, with great ease and, further, that little or no lubricants are needed in effecting such compression since the mixtures seldom adhere to the compression apparatus; furthermore the compressed bodies produced from such mixtures have been found in general to have exceptional structural strength so that use of binders may be largely or entirely dispensed with in preparing such bodies. Upon heating the compressed body in an oxidizing atmosphere the oxidant content thereof decomposes to evolve gaseous oxides, which have the effect of oxidizing the metal in the interior of the body and at the same time forming minute channels therein, rendering the resulting catalyst body highly porous. The resulting product, therefore, not only is highly porous and possesses exceptional structural strength, but is an extremely active catalyst since substantially all portions of the body are accessible to the reacting gases and the metal is substantially completely converted to the corresponding oxide. Thus I have found such catalyst bodies are extremely useful for effecting dehydrogenation reactions such as dehydrogenation of cyclohexanol to cyclohexanone. Furthermore, the catalyst produced in accordance with my invention may be reduced to the corresponding metal to form a highly active metal catalyst useful in hydrogenation reactions. Examples of other reactions which may be conducted in the presence of catalysts prepared in accordance with the present invention are desulfurization, dehydration, alkylation, dealkylation, catalytic oxidation, and Fischer-Tropsch type of reaction.

The metals employed in accordance with my invention may be any metal from which active catalysts may be prepared. Thus, the catalyst bodies of my invention may suitably be prepared from copper, iron, nickel, cobalt, chromium, molybdenum, zinc and silver or mixtures thereof. Alloys of metals may also be utilized, such as an alloy of 90% copper and 10% magnesium, and it is to be understood the term "metal" is used herein to denote both pure metals, mixtures of metals and alloys. The metal, prior to compression, may, if desired, be admixed with a minor amount of an oxide of the metal or a salt or the metal convertible to the oxide upon heating in air, e. g. the carbonates.

The oxidant employed in preparing my novel catalyst bodies depends to a great extent upon the nature of the catalytic material to be produced. Nitrates have been found to be eminently satisfactory oxidants, decomposing at relatively low temperatures with the evolution of nitrogen oxides which oxidize the catalyst metal and cause the formation of a porous catalyst body. Nitrites, permanganates and dichromates which decompose below the temperature at which sintering of the catalyst metal occurs may also be employed. If the catalyst desired is to consist solely of metal or metal oxide in unpromoted form, the nitrate utilized in preparing such catalyst body in accordance with my invention is preferably ammonium nitrate. If, however, the desired catalyst is to contain a promoter metal or metal oxide, then I prefer to incorporate in the mixture to be compressed a nitrate of the promoter metal, which replaces in part the ammonium nitrate. For example, if it is desired to produce a copper catalyst promoted with calcium, magnesium or barium, the catalyst may be prepared by forming a mixture of metallic copper with calcium, magnesium or barium nitrate and ammonium nitrate; such mixture after being compressed into a body of the desired form may then be heated in an oxidizing atmosphere, whereby the nitrates decompose to form the desired highly porous catalyst bodies of my invention containing the promoter metal oxide intimately incorporated therewith. If desired, the nitrate of the catalytic metal may be employed as the oxidant.

Although the catalysts may be prepared by heating in the presence of an inert atmosphere, I prefer to conduct the heating in the presence of air or other suitable oxidizing atmosphere. In general, if more internal oxidant is used, less air oxidation will be required. Sufficient internal oxidant may be incorporated into the catalyst body to allow heating in an inert atmosphere. Often it is desirable to leave sizable amounts of the unoxidized metal in the catalyst to give structural strength to the catalyst body. In these instances it is not desirable to effect complete oxidation of the metal.

It is to be understood the term "promoter metal oxidant" is used herein to denote compounds composed of a metal cation and a suitable oxidizing anion which will furnish a metal oxide or a metal capable of promoting the catalyst ultimately produced by the process of my invention.

As in conventional practice, carriers, binders, fillers, extenders and lubricants may, if desired, be incorporated in the mixture prior to compressing the mixture into bodies of predetermined form, but a feature of my invention is that the use of such ingredients may be largely or entirely dispensed with, since the metal present in the mixture being compressed permits compressed bodies of predetermined form to be readily prepared without the use of substantial amounts of such materials.

In preparing the catalyst of my invention the metal and oxidant in finely divided form are intimately mixed; preferably the amount of oxidant employed varies between about 1% and about 25% of the weight of the metal. As above noted, an oxide of the metal, or a salt thereof, decomposable to the oxide at elevated temperatures, may also be included in the mixture if desired. The mixture thus formed is then compressed under pressure sufficient to form mechanically strong, firm bodies in the form of pellets, tablets, rods or the like, and the compressed bodies may then be dried by heating at temperatures of the order of 80° to 110° C. The metal oxide catalyst may then be produced by heating the compressed bodies in the presence of air or other oxygen-containing gas at temperatures between 300° and 675° C., preferably between 300° and 400° C., when ammonium nitrate is utilized, whereby the oxidant in the compressed body decomposes and the metal is oxidized to form a highly porous but structurally strong catalyst body. The catalysts thus formed are then ready for use as dehydrogenation catalysts. If it is desired to produce hydrogenation catalysts therefrom, the bodies produced as above described are reduced by hydrogen to convert the metal oxide to the corresponding metal, whereby a highly porous, active metal catalyst body is produced.

The following examples are illustrative of my invention; amounts are given in parts or percent by weight:

*Example 1.*—75 parts of finely divided copper, 15 parts of magnesium oxide and 10 parts of ammonium nitrate were mixed, the mixture pelleted and the pellets then dried at 80° to 110° C. and heated in the presence of air for approximately 5 hours. This catalyst was then tested for its activity by passing cyclohexanol vapors thereover at a rate of 1 pound of cyclohexanol per hour per 0.01 cu. ft. of catalyst, the converter temperature being maintained at 300° C.

A second catalyst was prepared by mixing 85 parts of finely divided copper with 15 parts of magnesium oxide, pelleting, drying and oxidizing as above described. This catalyst was also tested for its activity under the same conditions as the first catalyst.

It was found that the activity of the first catalyst, as exemplified by yield of cyclohexanone per unit time, maintained substantially the same activity even after 35 hours of use, whereas the second catalyst dropped off sharply in activity after 25 hours of use.

*Example 2.*—70 parts of finely divided copper, 20 parts of finely divided alumina and 10 parts of finely divided crystalline ammonium nitrate were intimately mixed until of uniform composition, the mixture pelleted under pressure sufficient to form mechanically strong, firm pellets; the pellets were then dried at 80° to 110° C. and heated in an excess of air at about 300° to 350° C. for 2 to 4 hours to convert the copper to the oxide form. Highly porous, mechanically strong catalyst pellets were obtained.

*Example 3.*—44 parts of finely divided metallic copper, 33 parts of finely divided copper carbonate, 12 parts of finely divided kieselguhr and 11 parts of finely divided crystalline ammonium nitrate were mixed and the mixture pelleted; the pellets thus produced were then heated in air at 300° to 350° C. for 2 to 3 hours. Highly porous, mechanically strong catalyst pellets were obtained

*Example 4.*—70 parts of finely divided metallic copper, 20 parts of finely divided magnesium oxide and 10 parts by weight of finely divided crystalline ammonium nitrate were mixed, pelleted and oxidized in air at 300° to 350° C. for 2 to 4 hours. Highly porous, mechanically strong catalyst pellets were obtained.

*Example 5.*—90 parts of iron filings and 10 parts of finely divided, crystalline ammonium nitrate were intimately mixed, pelleted and oxidized in air at 300° to 375° C. for 4 hours. Highly porous, mechanically strong catalyst pellets were obtained.

Example 6.—97.5 parts of a finely divided alloy containing 90% copper and 10% magnesium, and 2.5 parts of finely divided, crystalline ammonium nitrate were mixed, pelleted and oxidized in air at temperatures slowly rising from room temperature to about 400° C. over a 2 to 4 hour period. Highly porous, mechanically strong catalyst pellets were obtained.

Example 7.—A mixture containing 30% basic copper carbonate, 50% Cu (powder), 10% MgO and 10% Mg(NO$_3$)$_2$ were pelleted very well in a $\frac{1}{16}$" die. The pellets were of dull copper color, quite strong and hard. Upon oxidation at 350° C., they became porous and were of even greater mechanical strength than the unoxidized pellets.

Example 8.—60% of a 90% Cu-10% Mg alloy, 15% basic copper carbonate, 7.5% MgO, 7.5% Mg(NO$_3$)$_2$ and 10% Cu were pelleted in a $\frac{1}{16}$" diameter die. The pellets formed were mechanically quite strong and porous after oxidation and subsequent reduction in hydrogen.

Example 9.—300 grams Fe (powder), 135 grams NiCO$_3$ and 7.83 grams of KNO$_3$ were thoroughly mixed for 10 minutes by hand and then pelleted. The resulting pellets which were firm and good in structural strength were then charged to an oxidation tube where the temperature was slowly raised while 5 liters per minute of air were being passed through. The pellets gave off a large amount of heat and reached a glow-heat. Temperature rose rapidly to 675° C. at which point the tube was removed. When the heat had subsided, the tube was reinstalled and the temperature kept at 500–600° C. for ½ hour. The density of the cold finished product was 1.2 grams/cc.

Example 10.—400 grams Fe (powder), 90 grams NiCO$_3$, 8.6 grams KNO$_3$, 17.2 grams

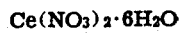

$$Ce(NO_3)_2 \cdot 6H_2O$$

and 20 grams NH$_4$NO$_3$ were ground, mixed and pelleted. The pellets were oxidized for 2 hours at 675–725° C. with air at 5 liters per minute. The mechanically strong oxidized pellets were reduced with hydrogen at the rate of 6 cu. ft./hr. for 2½ hours at 490–510° C. The catalyst proved effective in high temperature dehydrogenation of cyclohexanol.

Example 11.—400 grams Fe (powder), 90 grams NiCO$_3$ and 50 grams KNO$_3$ were ground and thoroughly mixed. The mixture was pelleted into $\frac{1}{16}$" diameter hard pellets which were placed in an oxidation tube and heated to 600–620° C. for 1½ hours while passing air over them at a rate of 5 liters per minute. The resulting oxidized pellets were hard and porous. After reduction with hydrogen, the pellets retained their porosity and good mechanical strength.

Example 12.—85 parts of finely divided metallic copper and 15 parts of finely divided Ca(MnO$_4$)$_2$ were mixed, pelleted and oxidized in air at 350° to 400° C. for 5 minutes. The oxidized pellets were then reduced in an atmosphere of hydrogen at approximately 300° C. for 1 hour. The hydrogen was then evacuated from the reducing apparatus containing the pellets; the pellets cooled to room temperature under 10$^{-6}$ mm. vacuum; and the apparatus flushed with nitrogen. Highly porous, mechanically strong catalyst pellets were obtained.

Example 13.—80 parts of finely divided metallic copper, 20 parts of finely divided Ca(MnO$_4$)$_2$ were mixed, pelleted and oxidized in air at 350° to 400° C. for 5 minutes. The oxidized pellets were then reduced with hydrogen in a manner similar to that described in Example 12. Mechanically strong catalyst pellets which had a porosity greater than the pellets in Example 12 were obtained.

Since certain changes may be made in carrying out the above process without departing from the scope of the invention, it is intended that all matter contained in the above description shall be interpreted as illustrative and not in a limiting sense.

I claim:

1. A process for preparing a porous dehydrogenation catalyst, which comprises mixing ammonium nitrate with finely divided copper, compressing the mixture to form a body of predetermined form and heating said body in an oxidizing atmosphere at a temperature in the range of 300° to 400° C. to effect decomposition of the ammonium nitrate and oxidation of the metal, thereby producing a highly porous, structurally strong copper oxide catalyst.

2. A process for preparing a porous dehydrogenation catalyst, which comprises mixing ammonium nitrate with finely divided iron, compressing the mixture to form a body of predetermined form and heating said body in an oxidizing atmosphere at a temperature in the range of 300° to 400° C. to effect decomposition of the ammonium nitrate and oxidation of the metal, thereby producing a highly porous, structurally strong iron oxide catalyst.

3. A process for preparing a porous catalyst which comprises mixing a finely divided metal from which active catalysts may be prepared with a solid substance which will decompose with the evolution of a gaseous oxidizing medium while heating to a temperature between 300° C. and 675° C., compressing the mixture to form a body of predetermined form and heating said body to a temperature in the range of 300° C. to 675° C. to effect decomposition of the solid substance and the liberation of a gaseous oxidizing medium.

4. A process for preparing a porous catalyst which comprises mixing a finely divided metal from which active catalysts may be prepared with a solid substance which will decompose with the evolution of a gaseous oxidizing medium while heating to a temperature between 300° C. and 675° C., compressing the mixture to form a body of predetermined form and heating said body to a temperature in the range of 300° C. to 675° C. to effect decomposition of the solid substance and oxidation of the metal.

5. A process for preparing a porous catalyst which comprises mixing a finely divided metal from which active catalysts may be prepared with a solid nitrate compound which will decompose with the evolution of a gaseous oxidizing medium while heating to a temperature between 300° C. and 675° C., compressing the mixture to form a body of predetermined form and heating said body to a temperature in the range of 300° C. to 675° C. to effect decomposition of the nitrate compound and oxidation of the metal, thereby producing a highly porous, structurally strong metal oxide body.

6. A process for preparing a porous catalyst which comprises mixing a finely divided metal from which active catalysts may be prepared with a mixture of ammonium nitrate and a promoter metal nitrate, compressing the mixture to form a body of predetermined form and heating said body in and oxidizing atmosphere to a temperature in the range of 300° C. to 675° C. to effect decomposition of the ammonium nitrate and oxidation of the metal, thereby producing a highly porous, structurally strong metal oxide body.

7. A process for preparing a porous catalyst which comprises mixing a finely divided metal from which active catalysts may be prepared with a solid substance which will decompose with the evolution of a gaseous oxidizing medium while heating to a temperature between 300° C. and 675° C., compressing the mixture to form a body of predetermined form, heating said body to a temperature in the range of 300° C. to 675° C. to effect decomposition of the solid substance and oxidation of the metal, and reducing the metal oxide to the corresponding metal so as to produce a highly porous, structurally strong metal catalyst body.

8. A process for preparing a porous catalyst which comprises mixing a finely divided metal from which active catalysts may be prepared with a solid nitrate compound which will decompose with the evolution of a gaseous oxidizing medium while heating to a temperature between 300° C. and 675° C., compressing the mixture to form a body of predetermined form, heating said body to a temperature in the range of 300° C. to 675° C. to effect decomposition of the solid nitrate compound and oxidation of the metal, and reducing the metal oxide to the corresponding metal so as to produce a highly porous, structurally strong metal catalyst body.

RUSSELL M. MANTELL.

REFERENCES CITED

The following references are of record in the file of this patent:

UNITED STATES PATENTS

| Number | Name | Date |
|---|---|---|
| 2,121,637 | Lemmers et al. | June 21, 1938 |
| 2,129,844 | Kiefer | Sept. 13, 1938 |
| 2,133,761 | Tietig | Oct. 18, 1938 |
| 2,203,895 | Davis et al. | June 11, 1940 |
| 2,239,800 | Vogt et al. | Apr. 29, 1941 |

OTHER REFERENCES

Jones: Powder Metallurgy, published by Edward Arnold Co., London, 1937, pages 134 and 136.